M. H. AVRAM.
MOTION PICTURE APPARATUS.
APPLICATION FILED JAN. 27, 1916.
1,260,280.
Patented Mar. 19, 1918.
6 SHEETS—SHEET 3.
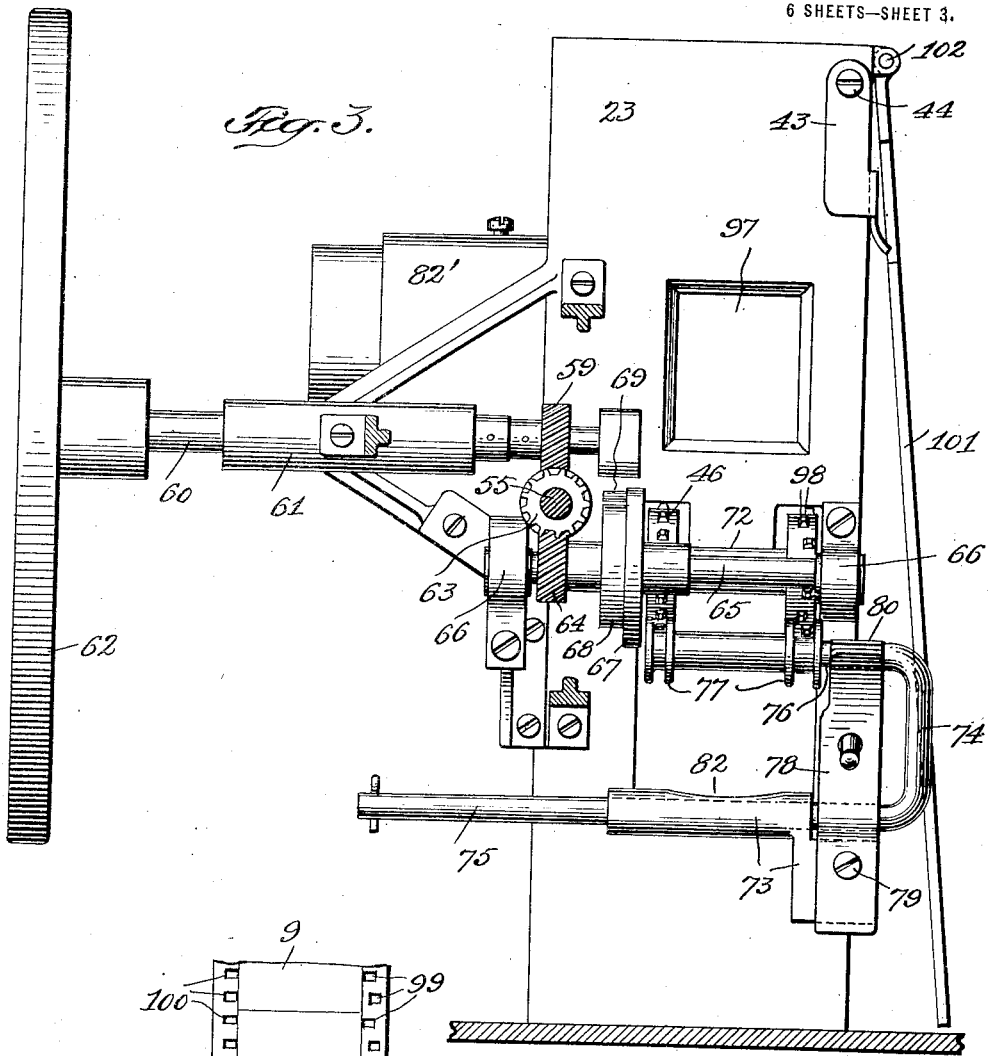
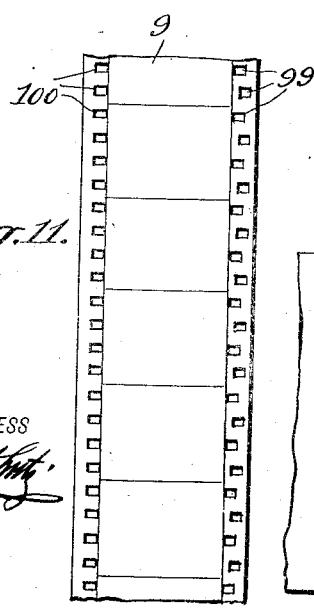
WITNESS
INVENTOR
ATTORNEY

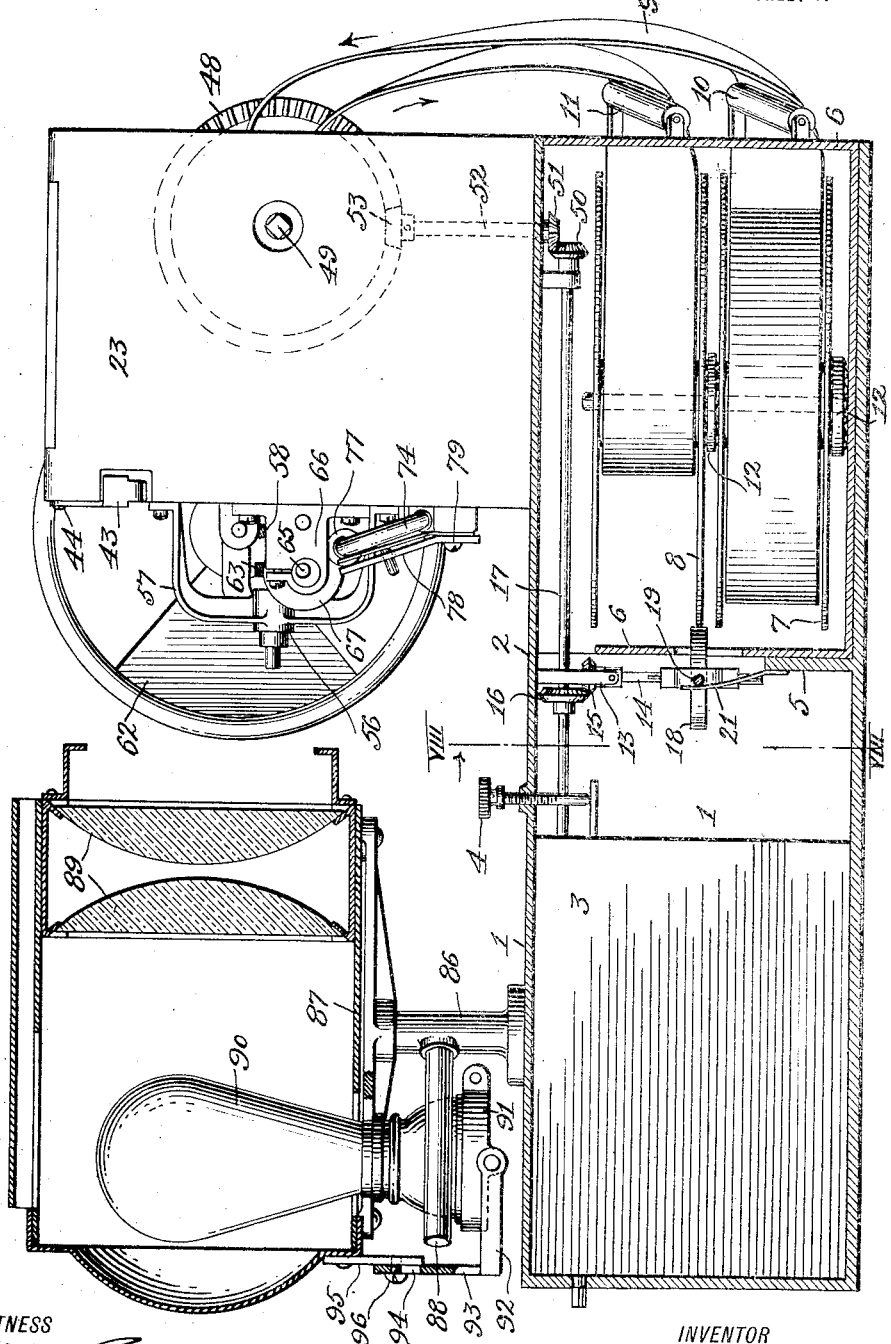

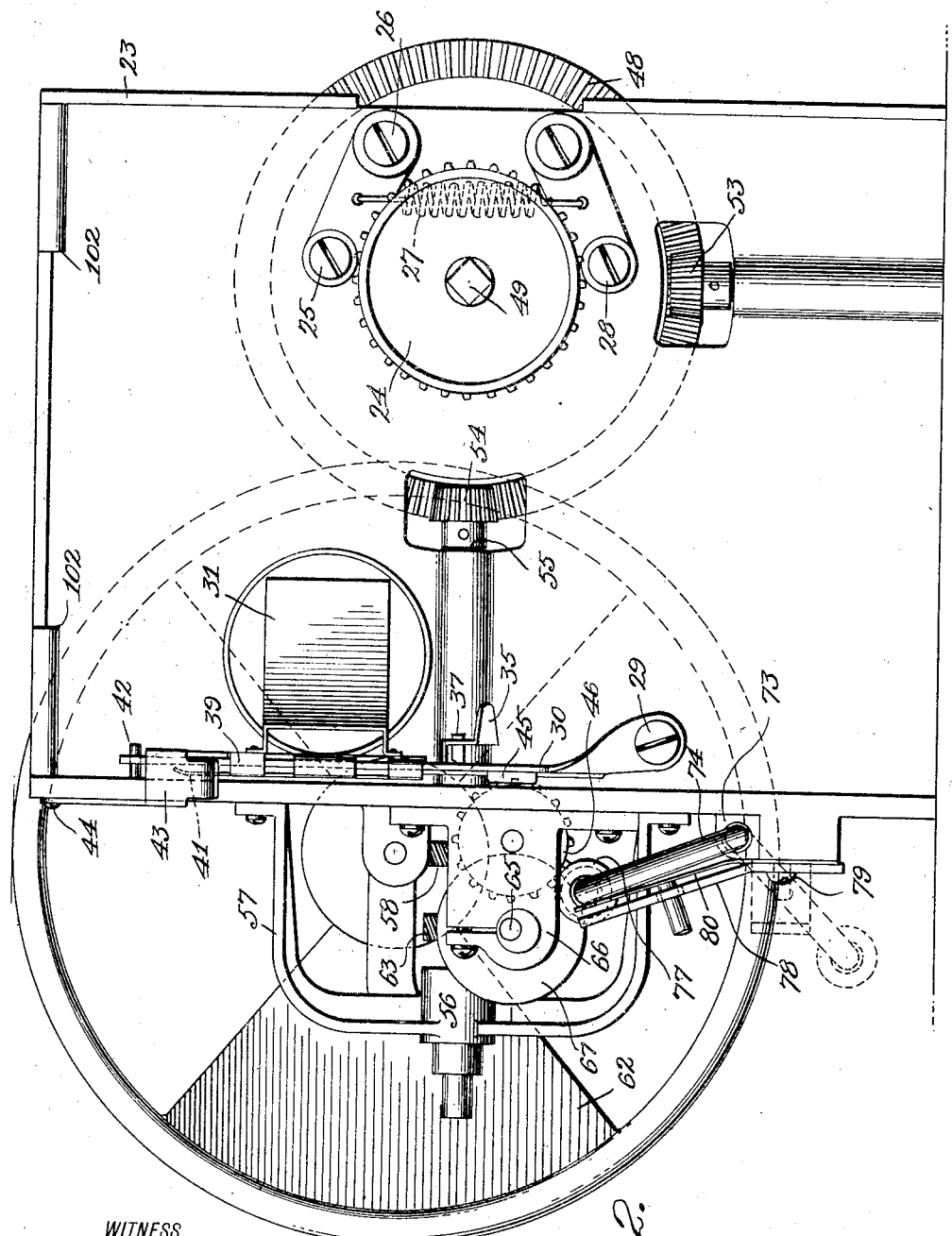

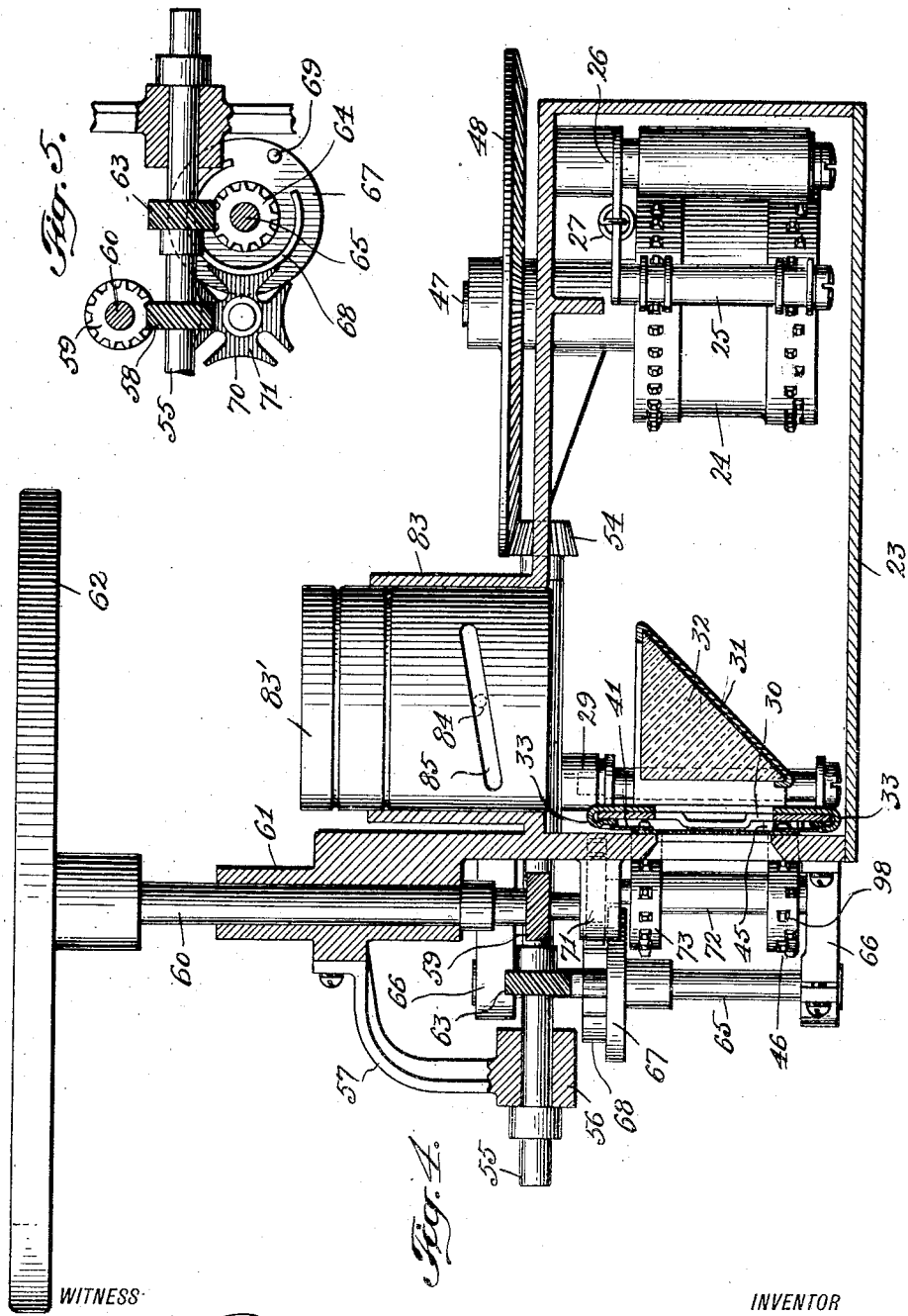

M. H. AVRAM.
MOTION PICTURE APPARATUS.
APPLICATION FILED JAN. 27, 1916.
1,260,280.
Patented Mar. 19, 1918.
6 SHEETS—SHEET 5.
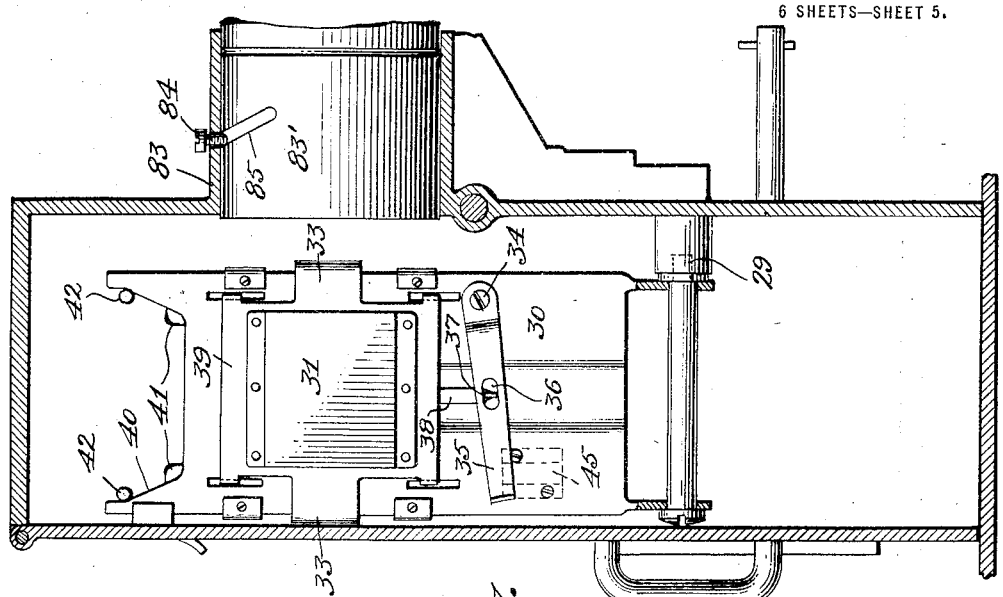
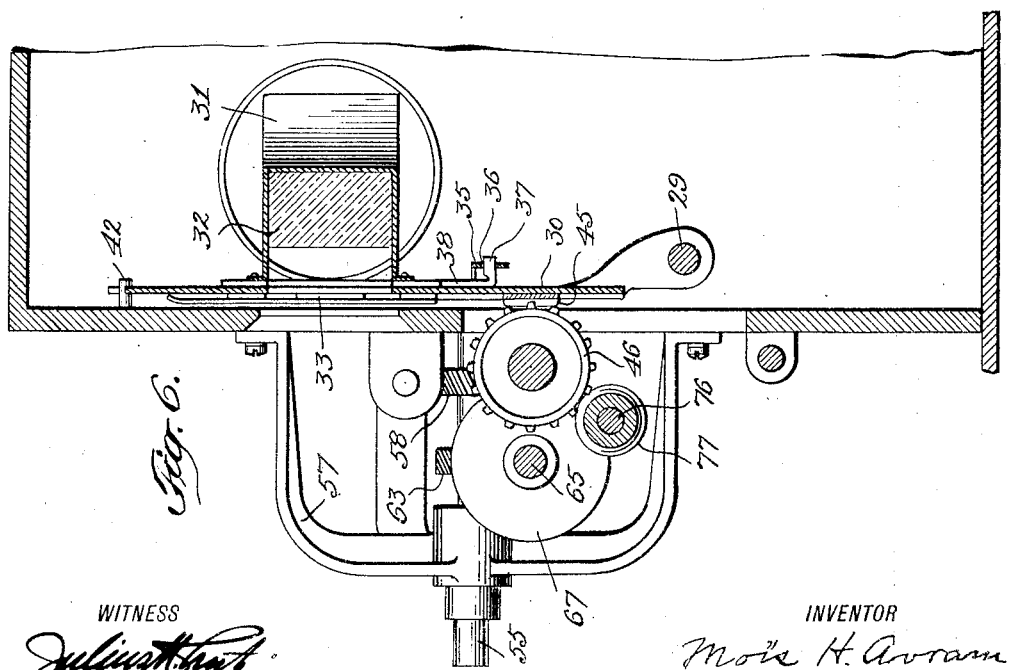
WITNESS
INVENTOR
Moïs H. Avram
By Percy B. Hills
ATTORNEY

M. H. AVRAM.
MOTION PICTURE APPARATUS.
APPLICATION FILED JAN. 27, 1916.

1,260,280.

Patented Mar. 19, 1918.
6 SHEETS—SHEET 6.

UNITED STATES PATENT OFFICE.

MOÏS H. AVRAM, OF NEW YORK, N. Y., ASSIGNOR TO SLOCUM, AVRAM & SLOCUM, INC., OF NEW YORK, N. Y., A CORPORATION OF NEW YORK.

MOTION-PICTURE APPARATUS.

1,260,280.   Specification of Letters Patent.   Patented Mar. 19, 1918.

Application filed January 27, 1916. Serial No. 74,720.

*To all whom it may concern:*

Be it known that I, Moïs H. AVRAM, a citizen of the United States, residing at New York, in the borough of Manhattan and State of New York, have invented certain new and useful Improvements in Motion-Picture Apparatus, of which the following is a specification.

My invention relates to motion picture apparatus in which the film is advanced step by step, and preferably of the portable type, and has for its main object to provide a complete structure of compact form, wherein both the driving mechanism and the feeding and receiving film reels are located in the base of the device, while the light and lens casing, as well as the shutter and the film feeding parts, are located on top of said base, the whole presenting a compact portable apparatus.

A further object of my invention is to provide an improved mechanism for transmitting the drive from the source of power to the shutter and to the film.

A still further object of my invention is to provide an improved construction of prism carrying plate, over one surface of which the film tracks in its passage through the machine, said plate embodying means for positively forcing the film at one side into intimate contact with the intermittent feed gear teeth.

Still another object of my invention is to provide an improved means for causing the film to engage with a plurality of the sprocket teeth of the intermittent feed mechanism.

My invention also embodies certain other minor details of improvement, as will be hereinafter more definitely pointed out and claimed, reference being had to the accompanying drawings, in which:—

Figure 1 is a view partly in longitudinal section and partly in side elevation of my improved apparatus.

Fig. 2 is an enlarged detail rear elevation of that portion of the machine embodying the shutter, the prism and the film feed mechanism, the rear wall of the casing containing said feed mechanism being removed.

Fig. 3 is an elevation of the shutter and the drive mechanism for the film.

Fig. 4 is a horizontal sectional view of that portion of the machine shown in Figs. 2 and 3, taken on a line through the shaft support of the shutter.

Fig. 5 is a front elevation of the gearing for transmitting motion from the drive shaft to the shutter and to the intermittent film feed mechanism.

Fig. 6 is a vertical sectional view, taken through the prism and the drive mechanism for the film.

Fig. 7 is a section taken at a right angle to Fig. 6.

Fig. 10 is a detail elevation of a portion of the base at one side.

Fig. 11 is an elevation of a section of the film used in this apparatus.

Similar numerals of reference denote corresponding parts in the several views.

Figure 8:
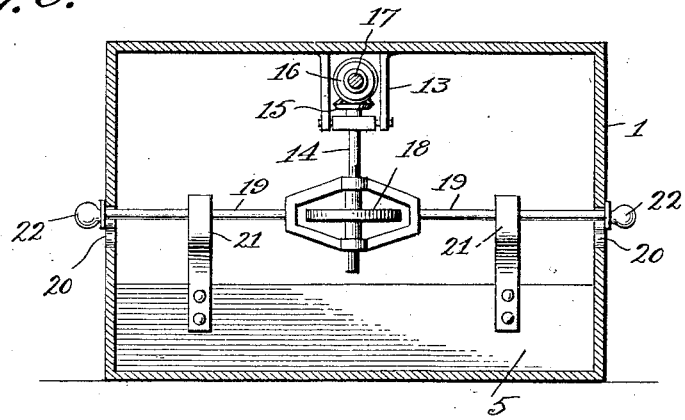
Fig. 8 is a vertical sectional view, taken on the line VIII—VIII of Fig. 1.

In the said drawings, the reference numeral 1 denotes the base of the machine, the same being in the form of a box and having mounted upon the upper wall 2 thereof the operating apparatus of the machine, hereinafter to be described. At one end the base is provided with a conventional spring motor (not shown), inclosed in a casing 3, the speed of said motor being capable of regulation in a conventional manner through a set screw 4. Or, if desired, an electric motor may be employed, disposed in said casing 3. Substantially midway of its length, said base is provided with a partition 5, extending from the bottom part-way toward the top of said base, and to the right of said partition is located a sliding box 6, adapted to be inserted into or removed from said base, and carrying the two film reels 7 and 8, the former being the feed reel and the latter the receiving reel. The film 9 passes from the feed reel 7 over a suitable guide roller 10 to the machine, and returns over a similar guide roller 11 to the receiving reel 8, both of said reels being mounted in ball bearings 12 and being removable from the box 6 when the latter is withdrawn from the base 1. In order to wind the film upon the receiving reel 8, I mount in the base 1, supported by a bracket 13, a shaft 14 having a bevel gear 15 in mesh with a similar bevel gear 16 mounted on the main drive shaft 17 of the machine, the latter being driven by the spring motor in the box 3. Splined to the shaft 14 is a friction wheel 18, which, in the position shown in Fig. 1, is in contact with the periphery of the reel 8, whereby the latter will be driven by the motion imparted by the shaft 17. In order to rewind the film when the same has run off the reel 7, the friction wheel 18 may be shifted from contact with reel 8 to contact with reel 7 by shifting its bearing 19 in the side walls of the base 1, the support for said bearing being shown in Fig. 10 to be a curved slot 20 in each side wall of the base 1. The bearing 19 is held for instance in the upper portion of said slot, as shown in Fig. 10, by means of spring leaves 21, best shown in Fig. 8, and the outer ends of the bearing 19 are provided with hand knobs 22 for manipulating the same.

The film 9 passing over the reel 7 enters one side of a casing 23, mounted on top of the base 1, and there passes over a sprocket wheel 24 having the usual double row of sprocket teeth to engage the perforations in the edges of the film, said film being maintained in contact with said sprocket wheel by the spring-pressed presser arm 25, pivoted at 26 in the frame, the spring 27, which exerts its tension upon said presser arm, also being connected with a lower presser arm 28, which in a similar manner acts upon the film in its passage out of the machine and on its way back to the reel 8. Pivoted at 29 near one side wall of the casing 23 is a combined guide plate and prism support 30, the construction of which is best seen in detail in Figs. 7 and 9. Said plate on its rear face has mounted the prism box 31 in which is carried the prism 32 for deflecting the light at a right angle, said prism box being slidably mounted upon said plate by means of arms 33 clipped around the edges of said plate. Pivoted at 34 to said plate is a lever 35, the same being apertured intermediate its length at 36 loosely to engage a lug 37 projecting from a tongue 38 depending from the prism box carrier 39. By this means, the prism box and its prism may be adjusted vertically to suit any desired screen conditions. At its top, the plate 30 is cut away at 40, and on the front of said plate are mounted two slightly yielding guides 41 lying in the path of the film, which passes down the front of said plate between the same and the wall of the casing 23, said plates being disposed to contact only with the edges of the film in which are located the sprocket perforations, thereby precluding any scratching of the body of the film by contact with said plate 30. Said plate 30, when swung to its operative position, is guided at its upper end by a pair of pins 42, projecting from the side wall of the casing 23, and is maintained in said operative position by means of a locking lever 43, pivoted at 44 to the side wall of the casing 23 and embracing the edge of said plate 30 and the wall of the casing. Fixed to the front face of said plate near its lower end at one side is a presser plate 45, shown in detail in Fig. 9, the same, when the plate 30 is in its operative position, overlying one row of sprockets on a feed sprocket wheel 46 disposed outside of the casing 23 and projecting in a suitable aperture therein. Said plate 45 is grooved to receive the row of teeth of said sprocket wheel, and acts to force the film on each side of the teeth into immediate contact with said wheel, for a purpose hereafter to be described.

The mechanism for driving the film will now be described as follows:—The shaft 47, upon which is mounted the sprocket wheel 24, is projected through the front of the casing 23, and has mounted thereon a bevel gear wheel 48. At its inner end said shaft 47 may, if desired, be shaped suitably at 49 to receive a driving handle, which may be applied thereto through the inner wall of the casing 23. Or when the device is to be driven by the spring motor or an electric motor in the box 3, the shaft 17 carries at its outer end a bevel gear 50 meshing with a right angled bevel gear 51 on a shaft 52, which latter at its other upper end carries a bevel gear 53 in mesh with the bevel gear 48, whereby the latter may be driven. Also in mesh with said bevel gear 48 is a bevel gear 54, fixed on the end of a shaft 55 that is mounted in suitable bearings in the front wall of the casing 23 and projects therethrough and is supported at its outer end in the hub 56 of a suitable bracket 57 bolted to the exterior of the casing. Fixed to said shaft 55 is an angled bevel gear 58, in mesh with a similar gear 59 mounted on a shaft 60 supported in suitable bearings 61 projecting from the casing 23, said shaft 60 having mounted at its outer end the shutter 62 of the apparatus. Also fixed to said shaft 55 is another angled bevel gear 63, which meshes with a similar gear 64 mounted on a shaft 65 also carried in suitable bearings in brackets 66 supported from the casing 23. Also mounted upon shaft 65 is a disk 67 having formed integral with its outer face a flange 68, the same being broken away, and said disk 67 also having mounted in proximity to said broken away portion a pin 69. Said flange 68 registers with correspondingly curved surfaces 70 of a star wheel 71, mounted upon a shaft 72, upon which the sprocket wheel 46 is mounted. The operation of this portion of the mechanism is such that the pin 69, which is outside of the periphery of the flange 68, engages at each revolution of the disk 67 with the star wheel 71 to rotate the latter a quarter turn, equivalent to that of four teeth on the sprocket wheel 46, the curved surfaces 70 of said star wheel contacting with the flange 68 of the disk 67 during the rest of the rotation of said disk, thereby maintaining said star wheel and the shaft 72 at rest except during such time as it is actuated by the pin 69.

Pivotally mounted in a bracket 73, carried by the end wall of the casing 23, is a U-shaped member 74 having one arm 75 elongated and forming a pivotal support for said member in connection with said bracket 73. The other arm 76 of said member is provided with the usual guides 77, which contact with the film, when the member is in operative position, to cause said film to contact with the sprocket wheel 46 around nearly one half of its circumference. That is to say, with said sprocket wheel provided with sixteen teeth in each of its two rows, this device causes the film to contact therewith over a space covering seven of said teeth. The member 74 is slidable longitudinally in the bracket 75, so that its arm 76 may be withdrawn transversely completely from the path of the film. Said member 74 is maintained in its operative position by means of a locking lever 78, pivoted at 79 to the bracket 73, said lever being provided on its inner surface with a spring leaf 80, which forms a yielding contact with the member 74 to maintain the same in its operative position with respect to the sprocket wheel 46.

In order that the body of the film may not be scratched in its passage over the horizontal portion of the bracket 73, I concave the upper surface of the same at 82, so that the perforated edges only of the film will contact with said bracket 73.

Mounted in a cylindrical projection 83 in the front wall of the casing 23 is the usual adjustable lens holder 83'; through which the image is projected from the prism 32 in the usual manner. The adjustment of the holder 83' is accomplished by a pin 84, fixed to the projection 83 and engaging an inclined slot 85 in said holder, whereby the rotation of the latter will cause its adjustment toward or from the prism 32.

Mounted upon a standard 86, which in turn is rotatably mounted upon the top of the box 1, is a light casing 87, said casing being capable of limited adjustable rotation on the standard 86 by manipulating a handle 88 attached thereto. Said casing contains the conventional condensing lenses 89, and at its other end is adapted to receive an incandescent lamp 90, preferably a Mazda lamp, the latter being supported in a socket 91, which in turn is pivoted to a yoke 92 having its end bent upwardly at 93 and slotted at 94 to engage a depending lug 95 supported from the casing 87, the connection between said portion 93 and lug 95 being through a screw 96, whereby the socket 91 may be adjusted vertically thereon, or swung in an arc. By this means, as well as by the pivoting of the socket 91, which carries the lamp 90, the latter may be accurately adjusted in any desired position within the casing 87.

Figure 9:
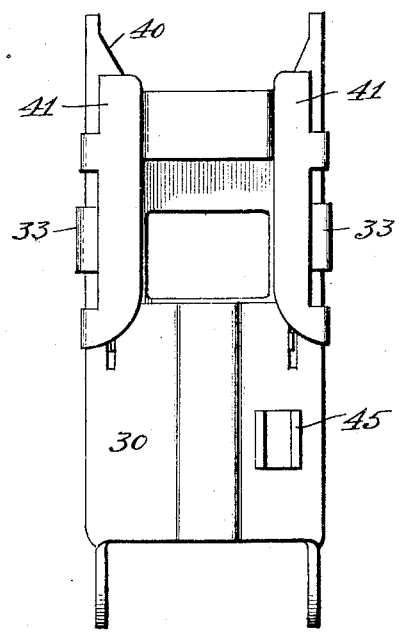
Fig. 9 is a detail elevation of the prism carrying plate, looking in the opposite direction from that of Fig. 7.

From the above description, the operation of my improved device will be understood to be as follows:—The film to be exhibited is wound upon the reel 7, and said reel, together with the receiving reel 8, is positioned in the box 6, and the latter slid into the base 1 of the device to the position shown in Fig. 1. With the friction wheel 18 disposed in the position shown in said figure, the same will contact with the edge of the reel 8, thereby transmitting a winding motion thereto when the shaft 17 is operated. The film 9 passes from the reel 7 over the sprocket wheel 24, where it is maintained in engagement therewith by the upper presser arm 25, and passes from thence upwardly and over the upper edge of the guide plate 30, which is cut away at 40, as shown in Figs. 7 and 9, to prevent the surface of the film from contacting with said plate, its edges only contacting with the guides 11. The film then passes downwardly between said plate 30 and the wall of the casing 23, and is carried out through an aperture in said casing and beneath the sprocket wheel 46 against which it is kept in engagement by the guides 77 of the arm 76, said arm having been slipped longitudinally into the loop formed by the film at this point. Said film as it leaves the sprocket wheel 46 is looped back through said aperture in the wall of the casing 23, and passes from thence beneath the sprocket wheel 24 against which it is kept in engagement by the lower presser arm 28. From said sprocket wheel the film is carried back to the receiving reel 8. If the device is to be driven manually, a suitable handle is fixed to the squared end 49 of the shaft 47, this drive being also imparted, through the shafts 52 and 17, to the shaft 14, and through the friction wheel 18 to the receiving reel 8, whereby the film will be wound thereon. If a spring driving mechanism, or an electric motor, disposed in the box 3 is employed, the shaft 17 becomes the primary drive, and said drive is imparted to the shaft 47 in the reverse manner to that above described. From the bevel gear wheel 48 on the shaft 47 the drive is imparted, through bevel gear 54, to the shaft 55, which in turn imparts a constant drive to the shutter 62 and an intermittent drive to the sprocket wheel 46 in a manner hereinbefore described, whereby the film is intermittently fed a distance equal to the length of a single picture thereon, this feed, of course, occurring when the obscuring portion of the shutter 62 registers with the lens holder 83'. It will thus be understood that the film is given a continuous feed from the reel 7 by means of the sprocket wheel 24; is given the usual intermittent feed past the point of light projection by means of sprocket wheel 46; is given a further positive return feed in its passage along the underside of the sprocket wheel 24; and is wound upon the receiving reel 8 in the manner hereinbefore described. The lamp in the light casing 87 being properly adjusted with respect to the lenses 89, by means of the adjustable bracket 91, the light beam is projected through the aperture 97 in the side wall of the casing 23 into the prism 32, whereby it is turned through an angle of 90° by said prism and passes through the lens in the holder 83' to the usual screen, said prism being vertically adjustable within a limited radius by means of the lever 35 in a manner readily understood. When the exhibition of a given film is completed, and it is desired to rewind the same upon the reel 7, the bearing 19 of the friction wheel 18 may be shifted manually to the bottom of the slots 20, whereby said friction wheel 18 will be shifted into contact with the edge of the reel 7, and the film may be rewound thereon by operating the shaft 17. In performing this rewinding operation, however, it is desirable that the film be disconnected from the feed mechanism in the casing 23, and thus run direct from reel 8 to reel 7.

The rules of the Board of Fire Underwriters forbid the use of inflammable films with portable picture apparatus, and as substantially all of the standard films are inflammable, it is desirable that portable apparatus of the character of the present invention be so constructed as to mutilate or destroy any standard films used therein, whereby the use of such standard films effectually will be prevented. This I accomplish by forming the right hand row of sprockets 98 on the sprocket wheel 46 alternately staggered. This necessitates that the film to be used with this apparatus shall be perforated in a similar manner, as shown at 99, in Fig. 11. The result of this construction is that if a standard film, in which the perforations on both sides are like those shown at 100 on the left hand side of the film 9 in Fig. 11, be operated in the present apparatus, each alternate perforation of the right hand row of perforations therein will be mutilated by its passage around the sprocket wheel 46. And this mutilation will be positively accomplished by reason of the employment of the presser plate 45 mounted upon the outer surface of the guide plate 30, which will force its film into positive contact with the staggered teeth 98 on the sprocket wheel 46, and effectually will prevent any danger of the film riding over the teeth.

Figure 12:
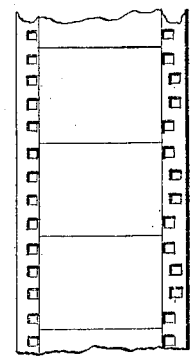
Fig. 12 is a view similar to Fig. 11, showing a modified form of film.
Figure 13:
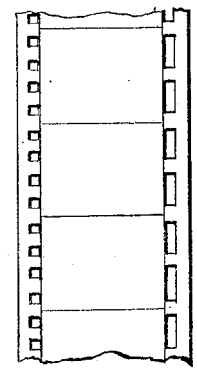
Fig. 13 is a similar view showing still another modification.

In Figs. 12 and 13, I have shown two modified forms of perforations in the film, that in Fig. 12 showing the perforations staggered in pairs, whereby the standard film would be torn by the outside pair of perforations, while in Fig. 13, the perforations are in alinement and of equal width with the standard perforations, but are each in length the size of two standard perforations plus the space intervening between them, whereby each tooth of similar size on the sprocket wheel 46 will tear the standard film. In fact this feature of the invention may be varied within considerable limits, and I do not wish to restrict myself to any of the constructions illustrated.

In order that the mechanism within the casing 23, and particularly the film, may be concealed and protected, I close the rear of said casing by means of a door 101, pivoted at its upper end to said casing at 102, as best shown in Fig. 3, where said door is shown partially open.

Having thus described my invention, what I claim as new and desire to secure by Letters Patent, is:—

1. In a motion picture apparatus, a guide plate for the film disposed in the line of projection of the light beam and down the face of which the film is fed intermittently, resilient guides on said face adapted to contact with the edges only of said film, said plate being cut away at its top to permit the passage of the film and said guides projecting into said cut away portion to receive said film.

2. In a motion picture apparatus, a guide plate for the film disposed in the line of projection of the light beam and down the face of which the film is fed intermittently, a sprocket wheel for feeding the film disposed in immediate proximity to the front face of said guide plate, and a grooved plate on said face of said guide plate into the groove of which one row of sprocket teeth of said sprocket wheel rotate, whereby the film at that point will be forced into immediate contact with said sprocket wheel on opposite sides of said sprocket teeth.

3. In a motion picture apparatus, a sprocket wheel, means for operating the same for feeding the film past the point of projection, and a pivoted guide arm adapted to maintain said film in contact with said sprocket wheel, said guide arm being bodily shiftable transversely of the film and out of the path of the same.

4. In a motion picture apparatus, a sprocket wheel, means for operating the same for feeding the film past the point of projection, a pivoted guide arm adapted to maintain said film in contact with said sprocket wheel, said guide arm being bodily shiftable transversely of the film and out of the path of the same, and means for maintaining said guide arm resiliently in contact with said sprocket wheel, when in operative position.

5. In a motion picture apparatus, a sprocket wheel, means for operating the same for feeding the film past the point of projection, a U-shaped member pivoted through one of its arms in the machine frame, and guides on its other arm adapted to contact with the film to maintain it against said sprocket wheel.

6. In a motion picture apparatus, a sprocket wheel, means for operating the same for feeding the film past the point of projection, a U-shaped member pivoted through one of its arms to the machine frame, and bodily shiftable longitudinally on said pivot, and guides mounted on the other and shorter arm of said member and adapted to maintain the film in contact with said sprocket wheel.

7. In a motion picture apparatus, a sprocket wheel, means for operating the same for feeding the film past the point of projection, a U-shaped member pivoted through one of its arms to the machine frame, and bodily shiftable longitudinally in said pivot, guides mounted on the other and shorter arm of said member and adapted to maintain the film in contact with said sprocket wheel, and a lever pivoted to the machine frame and adapted to be swung into contact with said U-shaped member to maintain it in such position as to retain the film in contact with said sprocket wheel.

8. In a motion picture apparatus, a sprocket wheel, means for operating the same for feeding the film past the point of projection, a U-shaped member pivoted through one of its arms to the machine frame, and bodily shiftable longitudinally in said pivot, guides mounted on the other and shorter arm of said member and adapted to maintain the film in contact with said sprocket wheel, a lever pivoted to the machine frame and adapted to be swung into contact with said U-shaped member to maintain it in such position as to retain the film in contact with said sprocket wheel, and a spring leaf on said lever interposed between the same and said U-shaped member for affording a resilient contact.

9. In a motion picture apparatus, a prism support, a prism therein, and means for adjusting said prism support and prism vertically with respect to the line of projection of the light beam.

10. In a motion picture apparatus, a guide plate for the film, a prism support carried by said guide plate and disposed in the line of projection of the light beam, a prism therein, and means for adjusting said prism support and prism vertically upon said guide plate.

In testimony whereof I hereunto set my hand January, 1916.

MOÏS H. AVRAM.

Copies of this patent may be obtained for five cents each, by addressing the "Commissioner of Patents, Washington, D. C."